United States Patent [19]

Binkley et al.

[11] 3,707,763
[45] Jan. 2, 1973

[54] BONDING TUNGSTEN WITH A FUGITIVE ALLOY BINDER

[75] Inventors: Norman C. Binkley, Oak Ridge; Joseph P. Hammond, Knoxville, both of Tenn.

[73] Assignee: The United States of America as represented by the United States Atomic Energy Commission

[22] Filed: July 1, 1971

[21] Appl. No.: 158,837

[52] U.S. Cl. ........................................29/498, 29/504
[51] Int. Cl. .........................B23k 31/02, B23k 35/24
[58] Field of Search..........................29/504, 502, 498

[56] References Cited

UNITED STATES PATENTS

| 3,241,230 | 3/1966 | Batista et al. | 29/498 X |
| 3,276,113 | 10/1966 | Metcalfe | 29/498 X |
| 3,353,259 | 11/1967 | Kirkpatrick | 29/498 X |
| 3,359,623 | 12/1967 | Gwyn, Jr. | 29/498 X |
| 3,363,306 | 1/1968 | Kirkpatrick | 29/498 X |
| 3,431,615 | 3/1969 | Hagadorn et al. | 29/494 X |
| 3,431,631 | 3/1969 | Hagadorn et al. | 29/494 X |

OTHER PUBLICATIONS

Albom, M. J., "Diffusion Bonding Tungsten," Welding Journal Research Supplement, Nov. 1962, pp. 491-S to 501-S. Technical Library.

Primary Examiner—J. Spencer Overholser
Assistant Examiner—Ronald J. Shore
Attorney—Roland A. Anderson

[57] ABSTRACT

A method of forming a tungsten-to-tungsten joint which comprises depositing on at least one of the faying surfaces a thin film, foil or coating of an alloy consisting essentially of, in weight percent, 55–75 percent nickel, balance iron, pressing the faying surfaces together, heating the joint area to just above the melting point of the alloy in an inert atmosphere to produce a joint which has a remelt temperature approximating the melting point of the tungsten-base metal.

1 Claim, 1 Drawing Figure

PATENTED JAN 2 1973                     3,707,763
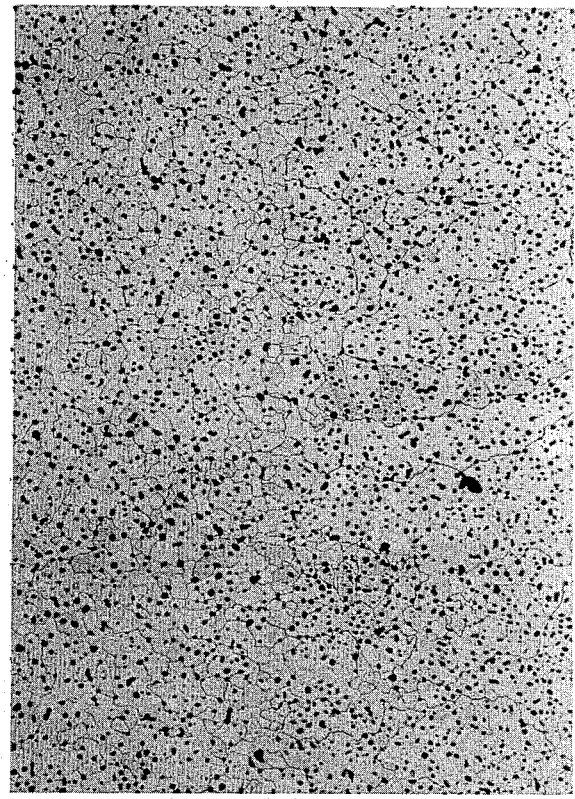
INVENTOR.
Norman C. Binkley
BY  Joseph P. Hammond
ATTORNEY.

BONDING TUNGSTEN WITH A FUGITIVE ALLOY BINDER

BACKGROUND OF THE INVENTION

The invention described herein was made in the course of, or under, a contract with the U. S. Atomic Energy Commission.

Tungsten and its alloys are considered applicable for many types of containers in high-temperature nuclear applications: nuclear reactors, isotope-fueled power sources, reactor fuel reprocessing, etc. One of the major problems encountered in using these materials for the applications is that of forming sound and sufficiently tough tungsten-to-tungsten joints.

Several methods of joining tungsten to itself have been utilized in the prior art: welding (fusion), brazing, and diffusion bonding. Fusion welding results in a weak and brittle structure. Large grains are formed in the weld nugget which reduce the strength and toughness. Furthermore, when recrystallization in the heat affected zone occurs, it results in a brittle condition.

Many brazing alloys have been developed for tungsten. A common problem in brazing is that of a low remelt temperature of the brazed joint when alloys are used to braze below the recrystallization temperature. This mitigates the high temperature characteristic of the tungsten. To overcome this problem, high melting temperature brazing alloys have been developed for use at temperatures above the recrystallization temperature. Joining techniques effected above the recrystallization temperature are undesirable, however, because of the tendency toward embrittlement. Furthermore, during high temperature service, one or more of the brazing alloy components frequently diffuse into the tungsten faster than other alloy components, with a resulting formation of Kirkendall voids. These voids then coalesce to form holes in the structure which severely weaken the joint.

Diffusion bonding of many types has been studied in connection with the joining of tungsten. It has been recognized that, if all oxide is removed from the surfaces to be joined and if there is high atomic conformity, tungsten can be joined to tungsten at relatively low temperature (<1600°C.) by applying only moderately high pressure. In practice, however, the surface conditions are difficult to achieve so that some workers have utilized an "intermediate" between the two surfaces which has good diffusivity and a high solubility for oxides. One of these is zirconium, but bonds with it result in a low remelting temperature. Tantalum gives a high remelt temperature, but this metal diffuses into tungsten faster than tungsten into it, resulting in Kirkendall-type holes which greatly weaken the joint.

SUMMARY OF THE INVENTION

It is therefore the primary object of the present development to provide a diffusion bonding method of joining tungsten to itself and to tungsten-base alloys which may be accomplished at relatively low temperatures and pressures with an attendant strong and tough joint at all operating temperatures.

The present invention may be defined as a brazing method which utilizes a fugitive liquid phase alloy binder to produce a tungsten-to-tungsten joint. The effective fugitive binder is a binary alloy of nickel and iron containing from 55 to 75 weight percent nickel. A satisfactory fugitive alloy binder should, in the preferred case, be free flowing at its melting point (i.e., exhibit zero wetting angle); melt below the recrystallization temperature of the tungsten or tungsten alloy parts to be joined; be selected from those metals which are mutually soluble with tungsten; form a eutectic with the metal to be joined, or exhibit a minimal temperature with it; have a solubility for oxides; and form no intermetallics.

We have found that a nickel-base alloy containing from 55 to 75 weight percent nickel, balance iron, is an alloy which meets the combination of aforementioned requirements to produce a direct tungsten-to-tungsten joint with no evidence of an intermediate alloy phase in the joint area. The individual components are known to have some solubility in tungsten, and some tungsten is soluble in each constituent. Furthermore, the solidus-liquidus lines of the phase diagram apparently converge, resulting in a system which has a fairly sharp melting point. Alloys within this range melt in the range 1430°–1450°C., a temperature well below the recrystallization temperature of tungsten. The ternary liquid phase is extremely free flowing and contains no intermetallic phases. Alloys containing less than 55 weight percent or more than 75 weight percent nickel are not suitable because of the tendency for brittle intermetallic formation.

The following example is provided as a representative embodiment of how this invention can be practiced to realize its attendant advantages.

EXAMPLE

Test joints of tungsten-to-tungsten were made using a 60 Ni - 40 Fe alloy. The alloy was placed on the surfaces to be joined in several forms: as a rolled foil, a vapor deposit, and as a powder coating. All joints were then assembled and pressed for 2 hours in a vacuum furnace at 1,500°C. using a pressure of about 1,000 psi. The techniques using the vapor deposit and foil appeared to give best results, and a preferred thickness of about 5 microns has been estimated, although this is not critical.

A typical photomicrograph of the test joints prepared on powder metallurgy bar stock tungsten is shown in the accompanying FIGURE. The dark spots represent pores which were present in the beginning metal structure and are characteristic of the particular type of tungsten used in these tests. The joint area is marked by the arrow. Without the arrow it would be difficult to identify the joint line. The microstructure is indicative of a joint that is as strong or stronger than the base metal. A test joint of this development using a 60 Ni - 40 Fe alloy with a melting point of 1,430°C. was heated to above 2,400°C. Although recrystallization occurred, no melting or weakening was observed at the interface. Thus, the remelt temperature is substantially above tungsten's recrystallization temperature and would appear to correspond to its melting temperature.

While the mechanism of fugitive liquid phase bonding has not been verified by experimentation, the following explanation is offered. Coalescence of the two pieces being joined is promoted initially by forming a ternary liquid phase which wets and spreads over faying surfaces of the joint. This occurs by the Ni-Fe intermediary reacting eutectically with the tungsten pieces or at least melting and then dissolving substantial amounts of tungsten to form a ternary liquidus minimum. Oxides or surface contaminants are dissolved in the liquid as it is squeezed to a thin film by the pressure of bonding. High points on the bonding surfaces are dissolved into the liquid and redeposited in valleys, thus promoting conformity across the bond interface. The nickel and iron of the residual liquid phase are eventually dissolved into the tungsten grains to a considerable depth into the mating pieces, leaving a joint region that is theoretically dense and devoid of any secondary phase.

What is claimed is:

1. A method of forming a tungsten-to-tungsten joint which comprises depositing on at least one of the faying surfaces a thin film or coating of an alloy consisting essentially of, in weight percent, 55–75 percent nickel, balance iron, pressing the faying surfaces together, heating the joint area to the melting point of the alloy in an inert atmosphere and maintaining the heat and pressure for sufficient time to produce a joint which has a remelt temperature approaching the melting point of the tungsten-base metal.

* * * * *